March 28, 1939.  P. BRÜHL  2,151,830
RADIAL ANTIFRICTION BEARING
Filed April 27, 1937
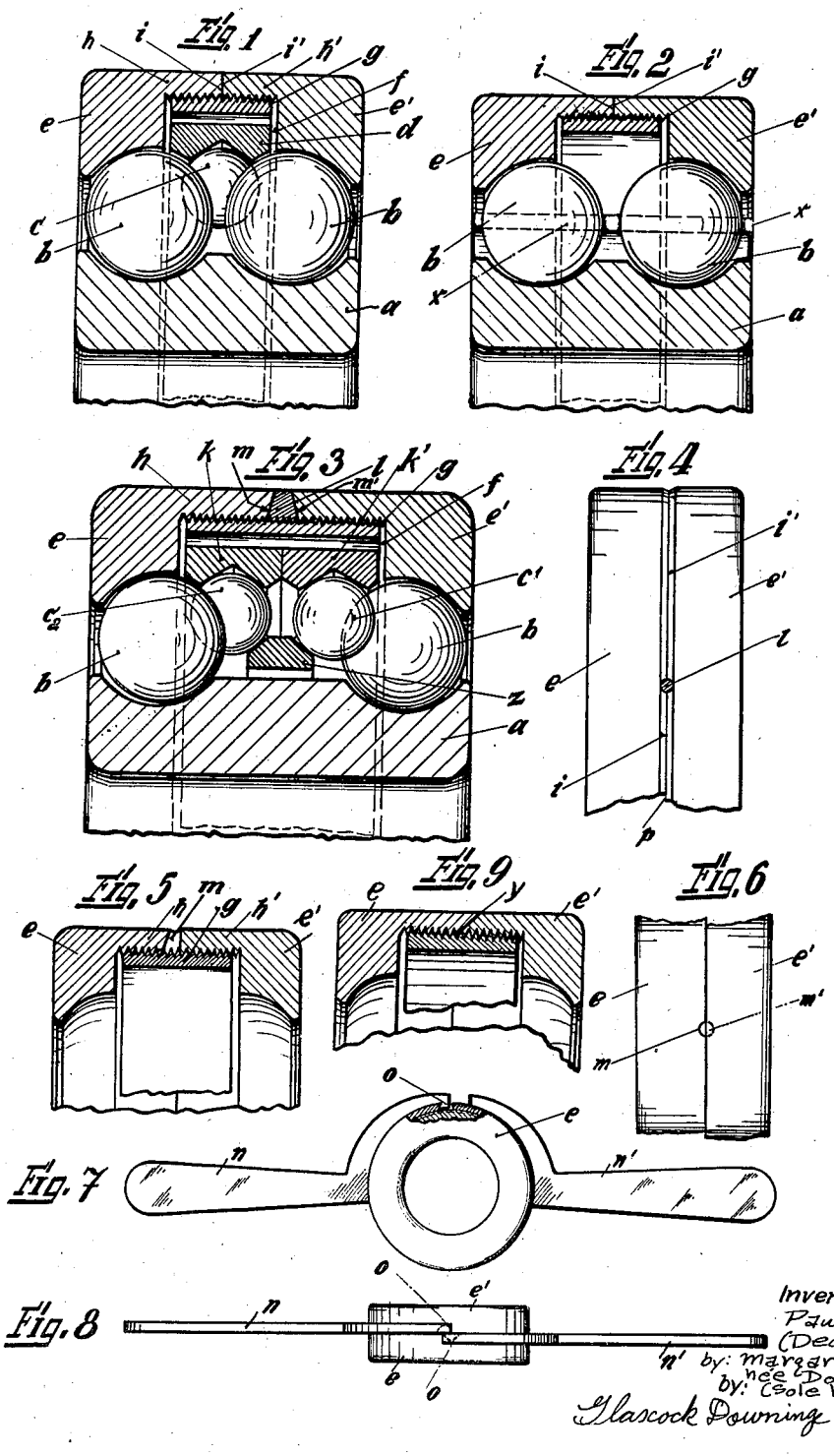

Patented Mar. 28, 1939

2,151,830

UNITED STATES PATENT OFFICE 2,151,830

RADIAL ANTIFRICTION BEARING

Paul Brühl, deceased, late of Berlin, Germany, by Margarete Brühl, nee Domnick, Berlin, Germany, sole heir Application April 27, 1937, Serial No. 139,326
In Germany May 9, 1936

5 Claims. (Cl. 308—200)

The invention relates to radial antifriction bearings, and more particularly to bearings having two rows of antifriction elements, and an outer race which is divided into two members transversely to the axis of the bearing.

It is an object of the invention to provide a bearing of the kind described in which the difficulties encountered in providing a reliable connection of the two outer-race members are eliminated, so that there is no eccentricity of the outer race, or its tracks, and that any relative rotation of the two members is avoided.

To this end, there is provided, in combination with two rows of antifriction elements, a pair of specially designed outer-race members, each with a spigot projecting inwardly from each member, and having a female thread on its inner side, and a sleeve of soft iron having a male thread on its outer side which is adapted to be engaged by the female threads of the two spigots. The two members are placed on the sleeve with their threaded spigots, and screwed home until the ends of the spigots meet and are forced into tight engagement.

Means for preventing relative rotation of the two outer-race members are not required if the antifriction elements of the two rows are connected for uniform rotation by spacing elements or cages, but if no such means are provided provision must be made for preventing relative rotation of the outer-race members if the elements in the two rows rotate at distinct velocities.

It is another object of this invention to provide means for locking the two members against relative rotation, and to this end a groove is preferably provided in each end of the spigots which grooves register when the members are in the proper relative position, and insert a locking member in the hole formed by the two registering grooves. A very convenient solution is to cast solder or a metal into the hole which absolutely prevents relative rotation of the two members.

In the accompanying drawing, various types of radial ball bearings are illustrated embodying this invention, by way of example.

In the drawing

Fig. 1 is a partial axial section of a bearing whose two rows of balls are connected by spacing balls so as to move at uniform velocity, Fig. 2 is a similar section of a bearing in which a cage is provided instead of the spacing balls, Fig. 3 is a similar setcion of a bearing whose members are locked against relative rotation by a plug of solder, Fig. 4 is a partial end elevation of this bearing, drawn to a smaller scale, Figs. 5 and 6 illustrate stages of the assembly of two outer-race members as shown in Fig. 4, Fig. 7 is an elevation, and Fig. 8 is a plan view, showing the use of two hook spanners for assembling the outer-race members, and Fig. 9 is a partly axial section of a bearing whose spigots are beveled at their inner ends.

Refering now to the drawing, in all figures $a$ is the inner race, $b$, $b$ are the two rows of principal antifriction members or balls, $e$ and $e'$ are the two outer-race members, with their spigots $h$ and $h'$, having a female thread on their inner sides, and their ends $i$ and $i'$ by which the spigots abut after having been placed on the sleeve $g$ in whose male thrade their female threads engage. $f$ is the clearance defined by the inwardly projecting spigots and the inner end walls of the members.

Referring now to Fig. 1, the principal balls $b$, $b$ of the two rows are spaced from each other, and compelled to move at uniform velocity, by spacer balls $c$ in a V race of a guide ring $d$ placed in the central clearance $f$.

Referring now to Fig. 2, this bearing is similar to the one just described but has a cage $x$ for connecting the principal balls $b$.

Since in both cases the balls of the two rows move at uniform velocity, the outer-race members $e$ and $e'$ have no tendency for relative rotation, and need not be locked.

The two outer-race members are threaded on the inner sides of their respective spigots $h$ and $h'$, hardened and ground at the ends $i$ and $i'$, and screwed firmly against each other on the sleeve $g$. No balls have yet been introduced. The outer end faces, the perimeter, and the tracks are now ground on the connected members $e$ and $e'$. When the several grinding operations have been performed, the outer-race members are separated, the principal and spacer balls are introduced, and the members $e$, $e'$ are placed on the sleeve $g$ again and screwed in so that the ends $i$, $i'$ of their spigots $h$, $h'$ engage at a certain pressure. This has the advantage that the members, with a very slight tolerance, occupy the same position in the finished bearing they assumed while being ground on the empty bearing.

Referring now to Figs. 3 and 4, this bearing has two rows of spacer balls $c'$ and $c_2$, each with a V guide ring $k$ and $k'$, respectively, the two guide rings being abutted at their inner ends. An inner guide ring $z$ supports the spacer balls of both rows.

Since no means are provided here for effecting uniform motion of the balls $b$ in both rows, the outer-race members $e$ and $e'$ must be locked against relative rotation. To this end, a groove $m$ is made in the member $e$, as best seen in Fig. 5, and a corresponding groove $m'$ is made in the member $e'$. Both grooves are widened inwardly. When the members $e$ and $e'$ are in the proper relative position, a plug $l$ of solder or other suitable material is cast into the tapering cavity formed by the two registering grooves. This plug which cannot fall out because it is wider at the bottom than at the top, absolutely prevents relative rotation of the two members e and e'. Obviously, I may provide more than one such plug along the perimeter of the bearing.

Preferably, I proceed as follows with a bearing of this type: A groove m is made in the end of one of the spigots, for instance, h in Fig. 5, which is wider at the bottom than at the top. Preferably, the groove is milled, or otherwise obtained, before the member e is hardened. The members are now hardened, and the ends of their spigots ground, and they are placed on the sleeve g, as described. Where the groove m is positioned, a mark m', Fig. 6, is made on the member e', the two members are removed from the sleeve g, a groove like the groove m is made in the end of the spigot h', and the members are again assembled on the sleeve g, so that the grooves m and m' register exactly. Preferably, this is effected by a pair of hook spanners, Figs. 7 and 8, the spanner n engaging in the groove m' with its hook o, and the spanner n' performing the same function in the groove m'. By turning the two spanners, the grooves are moved into registering relation and the ends of the spigots now engage against each other at the same pressure as during the first screwing together, Fig. 5. The members are now ground as described. However, they might also be assembled as in Fig. 5, the groove m' might be marked, and the tracks might be ground, whereupon the members e and e' are taken apart as described for making the groove m'. When the tracks have been ground and the other grinding operations have been completed, the balls are inserted, the members e and e' are placed on the sleeve, the two grooves m and m' are moved into registering relation, preferably again by means of the hook spanners n and n', and the plug l is cast in the cavity formed by the grooves m and m'. The solder, or metal, is overheated to make it thin, and forced into the cavity by the soldering copper. When this has been done, a slight bevel p, Fig. 4, is ground on the inner ends of the spigots adjacent their abutting faces. This prevents projecting of the plug beyond the perimeter of the outer race, and also prevents that a sharp edge, however small, projects from the bearing at the partition which would be unconvenient in assembling the bearing.

The members e and e' are secured against relative rotation by the plug l but they might rotate together on the sleeve g. This, however, is not of any importance since the movement is limited by one of the ends of sleeve g abutting against the adjacent wall of the central clearance f. As the length of the clearance is only slightly in excess of the length of the sleeve, this movement is quite small.

In all bearings which have been illustrated, the partition y, Fig. 9, might also be beveled instead of being flat which has the advantage of automatic centering of the outer-race members e and e'.

The bearings according to my invention have the advantage that the ends i and i', or the beveled partition y, are continuous surfaces from the inner to the outer perimeter, and so are easily machined, preferably ground, to close limits. Another advantage is that the two outer-race members e and e' are quite similar which facilitates their manufacture. Still another advantage is that the sleeve g which need not be hardened and is preferably made of soft iron, can be thinner than the two threaded spigots of members connected by screwing them together. Such a sleeve, of small cross-section, and of soft metal, also makes up for any distortion the outer-race members may have undergone during the hardening. Sleeves finished to various tolerances may be kept in stock to make up for inaccuracies of the members.

I claim:

1. In a radial antifriction bearing, two rows of antifriction elements, a pair of outer-race members of hard metal, a spigot with a female thread on its inner side integral with and projecting inwardly from each member, and a sleeve of soft metal, and having a male thread on its outer side for the reception of the female threads in the spigots.

2. In a radial antifriction bearing, two rows of antifriction elements, means for imparting uniform velocity of rotation to the elements in each row, a pair of outer-race members of hard metal, a spigot with a female thread on its inner side integral with and projecting inwardly from each member and having a plain end face for abutting against the plain end face of the other spigot, and a thin sleeve of soft iron having a male thread on its outer side for the reception of the female threads in the spigots.

3. In a radial antifriction bearing, two rows of antifriction elements, a pair of outer-race members of hard metal, a spigot with a female thread on its inner side integral with and projecting inwardly from each member, a sleeve of soft metal having a male thread on its outer side for the reception of the female threads of the spigots, and locking means for preventing relative rotation of the two members.

4. In a radial antifriction bearing, two rows of antifriction elements, a pair of outer-race members of hard metal, a spigot with a female thread on its inner side and a recess in its end which is wider at its outer than at its inner end, the spigots being integral with and projecting inwardly from the corresponding members, the recesses when registering with each other provide a tapered cavity, a sleeve of soft metal having a male thread on its outer side for the reception of the female threads in the spigots, and a plug of low-melting metal cast into the tapered cavity for locking the members against relative rotation.

5. In a radial antifriction bearing, two rows of antifriction elements, a pair of outer-race members of hard metal, a spigot integral with and projecting inwardly from each member and provided with a female thread on its inner side and a recess in its end, a sleeve of soft metal having a male thread on its outer face for the reception of the female threads in the spigots, a plug of low-melting metal cast into the cavity made up by the registering recesses, and a beveled portion on each spigot in the vicinity of the cavity.

MARGARETE BRÜHL, GEB. DOMNICK,
*Sole Heir of Paul Brühl, Deceased.*